United States Patent Office 2,979,774
Patented Apr. 18, 1961

2,979,774

METHOD FOR OBTAINING SHAPED THERMOPLASTIC ARTICLES HAVING IMPROVED MECHANICAL PROPERTIES

Vincenzo Rusignolo, Terni, Italy, assignor to Montecatini Societa Generale per l'Industria Mineraria e Chimica, Milan, Italy No Drawing. Filed Oct. 22, 1957, Ser. No. 691,528

Claims priority, application Italy Oct. 24, 1956

9 Claims. (Cl. 18—48)

This invention relates to stretched articles formed from thermoplastic high polymers. More particularly, the invention is concerned with stretched articles formed from normally solid polymers of propylene.

Recently, G. Natta and his co-workers have disclosed new solid stereoisomeric polymers of the alpha-olefines $CH_2=CHR$ in which R is a hydrocarbon radical, which polymers by virtue of their different structures may be crystallizable or amorphous and non-crystallizable.

These new polymers were called "isotactic" and "atactic" polymers respectively, by G. Natta and those terms, which are used herein, have been adopted by the art.

The isotactic (crystallizable; crystalline) poly (alpha-olefines) are linear, head-to-tail polymers consisting of macromolecules in which substantially all of the asymmetric tertiary main-chain carbon atoms of adjacent monomeric units have the same steric configuration and the main chain of the macromolecules, if fully extended in a plane, shows substantially all of the R groups bound to the tertiary carbon atoms of monomeric units making up a given section of the main chain on one side of the plane and all of the hydrogen atoms bound to said tertiary carbon atoms on the opposite side.

The atactic (amorphous; non-crystallizable) poly(alpha-olefines) are also linear, head-to-tail polymers but consist essentially of macromolecules in which tertiary asymmetric carbon atoms of the main chain having the same steric configuration have substantially a random distribution, and the main chain of the macromolecules, if fully extended in a plane, shows the R groups and the hydrogen atoms bound to the tertiary carbon atoms substantially in random distribution on the two sides of the plane.

As Natta et al. have shown, the two types of polymers exist in admixture in the crude product obtained, by polymerizing the alpha-olefine with the aid of a catalyst prepared from a compound, e.g., a halide of a transition metal of groups IV to VI of the periodic table and a metallorganic compound of a metal of groups I–III of the periodic table, in a hydrocarbon solvent inert to the catalyst, in the absence of air, and at atmospheric pressure or slightly increased pressure and a temperature of $-80°$ C. to $+250°$ C., and can be separated from the polymerizate by fractionation thereof with selective solvents.

Natta et al. have also shown in the literature that by selection of the catalyst-forming components it is possible to orient the polymerization of the alpha-olefine to the production of prevailingly (over 50%) to substantially completely isotactic polymers or to the production of prevailingly to completely atactic polymers. Thus, if the catalyst is a solid which is difficultly dispersible in the hydrocarbon solvent, as is the catalyst prepared from a metal alkyl like triethyl aluminum and a low valency compound of the transition metal, e.g., titanium trichloride, the product is prevailingly to completely the isotactic polymer. On the other hand, if the catalyst is a liquid which is readily dispersible in or miscible with the hydrocarbon solvent, e.g., if it is the reaction product of the metal alkyl and a high valency compound of the transition metal, for instance titanium tetrachloride, the product is the prevailingly to substantially completely atactic polymer.

An object of the present invention is to provide new and improved stretched articles, such as fibers, tapes, and films of the normally solid, high molecular weight polypropylenes which comprise, prevailingly isotactic (crystallizable) polypropylenes.

It is known that, in general, the mechanical properties of films formed from high polymers are improved to a marked degree by stretching the films in one or both directions. The stretching is usually carried out on amorphous films at temperatures close to the 2nd order transition temperature and results in a high degree of orientation of the polymer molecules. In the case of some thermoplastic polymers, however, the 2nd order transition temperature is considerably below room temperature and it is practically impossible to obtain amorphous films of the polymers after the usual extrusion and quenching operations. Instead, the films obtained are partially crystalline and comprise spherulites and crystallites which render the stretching very difficult.

In the case of polypropylene, which has a 2nd order transition temperature of about $-36°$ C., it has been found that, although the films obtained by extruding the melted polymer in the form of a film and quenching the film are partially crystalline, those films can be oriented successfully by stretching the films under heating, preferably in the direction of the film length. The stretching can be accomplished by passing the film between rolls rotating at different peripheral speeds which determine the stretching ratios and at temperatures between room temperature and close to the melting point of the polypropylene.

The films thus obtained have a high ultimate strength in the stretching direction, which increases with the stretching ratio and is at a maximum when the stretching temperature is about 90° C. For example, an unstretched crystalline polypropylene film showed, after extrusion, and in all directions, the following mechanical properties—

Ultimate tensile strength _____kg./mm.$^2$__ 3.3
Ultimate yielding strength _____ kg./mm.$^2$__ 3.0
Elongation at break _____percent__ 520

After stretching (stretch ratio 1:5) in the longitudinal direction, the film had modified mechanical properties as shown below—

Ultimate tensile strength in the stretching direction
    kg./mm.$^2$__ 17.8
Elongation at break in the stretching direction
    percent__ 17.2
Ultimate yielding strength in the stretching direction
    kg./mm.$^2$__ 17.7

The stretched film is useful for all applications which require high ultimate tensile and yielding strengths in the longitudinal direction.

It has now been found, in accordance with the present invention, that shaped articles such as films, tapes, fibers and so on having even better mechanical properties than those listed above are obtained by stretching the films in the presence of substances which inhibit the tendency of the polypropylene in the film, etc. to crystallize, so that crystallization of the polypropylene during the stretching is avoided.

According to one embodiment of the invention the substance (or substances) which inhibit crystallization of the polypropylene is (are) incorporated in the polypropylene before it is extruded or otherwise formed into a shaped article and the article comprising the inhibitor is stretched.

According to another embodiment, a shaped article comprising, prevailingly, crystallizable polypropylene is passed through a bath of a liquid which inhibits crystallization of the polymer, removed from the liquid, and stretched in the presence of liquid incorporated therewith or clinging thereto as a result of its immersion in the bath.

In still another embodiment of the invention, the shaped article comprising, prevailingly, crystallizable polypropylene is stretched while it is passing through a body of the liquid crystallization inhibitor.

The invention also contemplates dissolving the prevailingly crystallizable polypropylene in a solvent therefor, such as a petroleum fraction having a boiling point between 140° C. and 250° C., shaping the solution under heating and with evaporation of the major portion of the solvent, and then stretching the article in the presence of the residual solvent.

When the crystallization inhibitor is a solid which does not appreciably alter the mechanical, optical or aesthetic properties of the article, it may be allowed to remain therein. Usually, however, after the article is stretched, it is treated to remove the crystallization inhibitor, crystallization of the polypropylene being allowed to proceed to completion during a heat-treatment of the article under a tension such that it is not free to shrink and which effects a dimensional stabilization of the article. The inhibitor may be removed by extraction from the shaped article by means of a solvent therefor or, depending on the particular inhibitor used, i.e., if it is a volatile substance, the heat-treatment may be sufficient to also remove the inhibitor from the shaped article.

A variety of different substances have been found to be effective for inhibiting crystallization of the polypropylene during stretching thereof. Included are hydrocarbons such as petroleum fractions boiling between 140° C. and 250° C., Vaseline, paraffine waxes, toluene, xylene, tetrahydro-naphthalene, decahydro-naphthalene, diphenyl, etc.

Halogenated hydrocarbons may also be used including tetrachloro-ethane, chlorobenzene, o-dichlorobenzene, naphthalene, dibromo-ethylene, etc.

Alcohols and ketones are also useful, such as methylethyl ketone, cyclopentanone, cyclohexanone, cetyl alcohol, cyclohexanol, mono-, di-, and triethylene glycol, and butylene glycol.

Other substances which have been found effective for inhibiting the crystallization of the polypropylene are butyl or isoamyl acetate, nitrobenzene, benzonitrile, thiophene, etc.

Some of the substances which inhibit crystallization of the polypropylene and thereby facilitate orientation of the films, etc. during the stretching, are solvents for the polymers at given temperatures. A solution of the polymer may be desired, as when the shaped article is to be formed by casting a solution onto a suitable surface. However, when solvation of the polymer is to be avoided, treatment of the shaped article with the inhibitor is carried out at temperatures below the temperature at which the inhibitor has a solvating effect on the polymer, which then becomes the upper limit of the temperature range in which the shaped article can be safely immersed in or otherwise treated with that particular inhibitor. Solvation of the polypropylene by inhibitors which are normally solvents therefor can also be avoided by using mixtures of solvents and non-solvents, and when such mixtures are used the temperature limitation which is imposed by the use of the solvent alone, is avoided.

The mechanical properties of fibers comprising, prevailingly, crystallizable polypropylene, as well as tapes, ribbons, strips and other articles thereof are also greatly improved by stretching the articles under heating in the presence of the crystallization inhibitor. By the practice of this invention, it is possible to orient fibers, etc. successfully, even when the articles are cold-stretched.

The temperature of stretching can be varied and is preferably from about 80° C. to about 130° C., while the stretching ratio is preferably included between 1:3 and 1:8.

The following examples are given to illustrate specific embodiments of the invention and are not intended as limitative. The intrinsic viscosity of the highly crystallizable polypropylene reported in the examples was determined in tetrahydro-naphthalene at 135° C.

*Example 1*

To a polymeric propylene comprising highly crystallizable polypropylene and having an intrinsic viscosity of 1.5, there was added 5% by weight of paraffine, and the mixture was homogenized in a mixer for 30 minutes.

A film was obtained by extrusion of the homogenized mass, and stretched in the longitudinal direction in water at 90° C. with a stretching ratio of 1:5. A film having the following characteristics was thus obtained—

Longitudinal ultimate tensile strength ___kg./mm.$^2$__ 16 and
Elongation at break _____percent__ 14
Transverse ultimate tensile strength ____kg./mm.$^2$__ 2 and
Elongation at break _____percent__ 60
Shrinkage at 100° C. after stabilization at 130° C.:
   Longitudinal _____percent__ 1
   Transverse _____do____ 0

*Example 2*

A thick (80 microns) film of polymeric propylene comprising highly isotactic polypropylene and having an intrinsic viscosity of 1.1, was immersed in a petroleum fraction (B.P. 180–200° C.) maintained at 70° C., for 60 seconds. The film was then stretched longitudinally in water at 80° C. with a stretching ratio of 1:4. The stretched film had the following characteristics—

Longitudinal ultimate tensile strength___kg./mm.$^2$__ 10.5
Longitudinal elongation at break_____percent__ 35
Transverse ultimate tensile strength_____kg./mm.$^2$__ 2.3
Transverse elongation at break_____percent__ 150
Shrinkage at 100° C. after stabilization at 130° C.:
   Longitudinal direction_____percent__ 0.7
   Tranverse direction_____do____ .0

*Example 3*

A mixture of polymeric propylene comprising highly crystallizable polypropylene and having an intrinsic viscosity of 2.2 and 5% by weight of a petroleum fraction (B.P. 200–250° C.) was prepared and homogenized in the cold in a mixer for 30 minutes. The homogenized mass thus obtained was placed in the screw feeder of an extruder and extruded in the form of a transparent and homogeneous film which was stretched successively in the two directions with a ratio of 1:3, in air at 90° C., without rupture. The stretched film was then passed under tension through an oven maintained at 130° C., being exposed to the elevated temperature in the oven for 6 minutes. The heating removed the petroleum fraction.

The resulting homogeneous, transparent film had a uniform thickness and the following characteristics for both directions Ultimate tensile strength_____kg./mm.²__ 8
Elongation at break_____percent__ 90
Shrinkage at 100° C_____do____ 0.5

Example 4

A film comprising isotactic polypropylene having an intrinsic viscosity of 1.3 was stretched in two orthogonal directions with a stretching ratio of 1:5 in a bath consisting of a petroleum fraction (B.P. 140–160° C.) maintained at 60° C. The film was then heated to 130° C. for 2 minutes under tension. The homogeneous, transparent film thus obtained had the following characteristics—for both directions Ultimate tensile strength_____kg./mm.²__ 15
Elongation at break_____percent__ 50
Shrinkage at 100° C_____do____ 1

Example 5

An unstretched extruded film comprising isotactic polypropylene having an intrinsic viscosity of 1.5 was passed continuously through a toluene bath at 70° C., each successive portion of the film being immersed in the bath for 30 seconds. The film was then stretched in two orthogonal directions in air at 90° C. with a stretching ratio of 1:6 and was then heated under tension at 130° C. for a minute. The final stretched film had characteristics as follows—for both directions Ultimate tensile strength_____kg./mm.²__ 20
Elongation at break_____percent__ 32

Example 6

30 parts of crystallizable polypropylene having an intrinsic viscosity of 4.3 were dispersed in the cold in 70 parts of a petroleum fraction having a boiling point of 180–200° C. The dispersion was converted to a solution by heating it to 160° C. The solution was then poured onto a moving endless tape on which the solvent was evaporated at 170° C. until the residual solvent content was about 8%.

The film thus obtained was stretched with a stretching ratio of 1:4 in a water bath at 90° C. The stretched film was passed under tension through an oven kept at 130° C. being exposed to the elevated temperature for 3 minutes, in order to evaporate the remaining portion of the petroleum fraction. The final film had the following characteristics—

Ultimate tensile strength_____kg./mm.²__ 13
Elongation at break_____percent__ 55
Shrinkage at 100° C_____do____ 0.6

Example 7

A film was prepared as in Example 3, except that 4% of paraffine was added to the polypropylene instead of the petroleum fraction, and finally heated at 130° C. for one minute. The characteristics of the film thus obtained were for both directions:

Ultimate tensile strength_____kg./mm.²__ 14
Elongation at break_____percent__ 60
Shrinkage at 100° C_____do____ 1

Example 8

A filament obtained by extruding crystallizable polypropylene (intrinsic viscosity of 0.95) and having a titer of 400 deniers was immersed for 30 seconds in a petroleum fraction having a boiling point between 180° C. and 210° C.

The filament was then stretched between a first roll rotating at a peripheral speed of 4 meters/minute and a second roll rotating at a peripheral speed of 26 meters/minute, and finally stabilized by heating it for a minute at 130° C. The properties of the stabilized filament were the following—

Ultimate tensile strength_____g./den__ 5
Elongation at break_____percent__ 23
Shrinkage in water at 100° C_____do____ 1.8

The films, tapes, bands, fibers etc. which are stretched in the presence of the crystallization inhibitor may be formed of the normally solid polypropylenes comprising a high percentage of crystallizable polypropylene.

It will be apparent that changes in details, such as the specific polypropylene which is extruded to form the film, fibers, tapes, etc., the particular crystallization inhibitor or mixture of inhibitors in the presence of which the film or the like is stretched, the stretching ratio, and the temperature of stabilization, may be made in practicing the invention without departing from the spirit thereof. It is intended, therefore, to include in the scope of the appended claims, all such changes and modifications as may be apparent to those skilled in the art.

What is claimed is:

1. A process for improving the mechanical properties of shaped articles comprising, prevailingly, isotactic, crystallizable polypropylene, which comprises stretching the articles in the presence of a hydrocarbon which, in and of itself, inhibits crystallization of the polypropylene.

2. A process for improving the mechanical properties of shaped articles comprising, prevailingly, isotactic crystallizable polypropylene, which comprises stretching the articles in the presence of a petroleum fraction having a boiling point between 140° C. and 250° C. and which, in and of itself, inhibits crystallization of the polypropylene.

3. A process for producing shaped articles comprising prevailingly, isotactic crystallizable polypropylene and having improved mechanical properties which comprises incorporating a hydrocarbon which, in and of itself, inhibits crystallization of the polypropylene with the polymer, extruding the mixture to obtain a shaped article, and stretching the shaped article in the presence of the crystallization inhibitor.

4. A process for producing shaped articles comprising, prevailingly, isotactic crystallizable polypropylene and having improved mechanical properties which comprises extruding the polypropylene to obtain the shaped article, incorporating in the shaped article a hydrocarbon which, in and of itself, inhibits crystallization of the polypropylene, and stretching the article in the presence of said inhibitor.

5. A process for producing shaped articles comprising, prevailingly, isotactic crystallizable polypropylene and having improved mechanical properties which comprises extruding the polypropylene to obtain the shaped article, and stretching the article while treating the same with a hydrocarbon which, in and of itself, inhibits crystallization of the polypropylene.

6. A process for producing shaped articles comprising, prevailingly, isotactic crystallizable polypropylene and having improved mechanical properties which comprises incorporating with the polypropylene a hydrocarbon which, in and of itself, inhibits crystallization thereof, stretching the shaped article in the presence of said inhibitor, and then removing the inhibitor from the stretched article.

7. A process for producing shaped articles comprising, prevailingly, isotactic crystallizable polypropylene and having improved mechanical properties which comprises incorporating with the polypropylene a hydrocarbon which, in and of itself, inhibits crystallization thereof, stretching the shaped article in the presence of said inhibitor, and then treating the shaped article with a solvent for the inhibitor to extract the same from said article.

8. A process for producing shaped articles comprising, prevailingly, isotactic crystallizable polypropylene and having improved mechanical properties which comprises incorporating with the polypropylene a hydrocarbon which, in and of itself, inhibits crystallization thereof, stretching the shaped article in the presence of said inhibitor, and then heating the shaped article to a temperature at which the inhibitor is volatilized therefrom.

9. A process for producing shaped articles comprising, prevailingly, isotactic crystallizable polypropylene and having improved mechanical properties which comprises mixing with the polypropylene a hydrocarbon which, in and of itself, inhibits crystallization thereof, extruding the mixture to obtain a shaped article, stretching the article under heating in the presence of said inhibitor, and then heating the article under tension to dimensionally stabilize the same.

References Cited in the file of this patent

UNITED STATES PATENTS

| | | |
|---|---|---|
| 2,691,647 | Field et al. | Oct. 12, 1954 |
| 2,743,994 | Channey et al. | May 1, 1956 |
| 2,791,576 | Field et al. | May 7, 1957 |